(12) United States Patent
Wong et al.

(10) Patent No.: US 9,037,546 B2
(45) Date of Patent: May 19, 2015

(54) SYSTEM, METHOD AND COMPUTER PROGRAM PRODUCT FOR AUTOMATIC CODE GENERATION FOR DATABASE OBJECT DELETION

(75) Inventors: Simon Wong, San Carlos, CA (US); Sonali Agrawal, San Carlos, CA (US)

(73) Assignee: salesforce.com, inc., San Francisco, CA (US)

( * ) Notice: Subject to any disclaimer, the term of this patent is extended or adjusted under 35 U.S.C. 154(b) by 143 days.

(21) Appl. No.: 13/072,608

(22) Filed: Mar. 25, 2011

(65) Prior Publication Data

US 2011/0238706 A1    Sep. 29, 2011

Related U.S. Application Data

(60) Provisional application No. 61/317,667, filed on Mar. 25, 2010.

(51) Int. Cl.
*G06F 7/00*   (2006.01)
*G06F 17/30*  (2006.01)

(52) U.S. Cl.
CPC ............................ *G06F 17/30595* (2013.01)

(58) Field of Classification Search
None
See application file for complete search history.

(56) References Cited

U.S. PATENT DOCUMENTS

| | | | |
|---|---|---|---|
| 5,577,188 A | 11/1996 | Zhu et al. | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |

(Continued)

FOREIGN PATENT DOCUMENTS

WO    WO 0190949 A1 * 11/2001

OTHER PUBLICATIONS

U.S. Appl. No. 60/828,192, filed Oct. 4, 2006.

*Primary Examiner* — Debbie Le
*Assistant Examiner* — Hasanul Mobin
(74) *Attorney, Agent, or Firm* — Zilka-Kotab, PC

(57) ABSTRACT

In accordance with embodiments, there are provided mechanisms and methods for automatic code generation for database object deletion. These mechanisms and methods for automatic code generation for database object deletion can generate code for deleting database objects in an automated manner. The ability to generate code for deleting database objects in an automated manner can enable the efficient and accurate deletion of database objects, including database objects with relationships to other database objects.

18 Claims, 6 Drawing Sheets

(56) References Cited

U.S. PATENT DOCUMENTS

| | | |
|---|---|---|
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner |
| 6,850,895 B2 | 2/2005 | Brodersen et al. |
| 6,850,949 B2 | 2/2005 | Warner et al. |
| 7,062,502 B1 | 6/2006 | Kesler |
| 7,181,758 B1 | 2/2007 | Chan |
| 7,209,929 B2 | 4/2007 | Dominguez, Jr. et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,577,681 B1 * | 8/2009 | Rozenman et al. .................. 1/1 |
| 7,620,655 B2 | 11/2009 | Larsson et al. |
| 7,698,160 B2 | 4/2010 | Beaven et al. |
| 8,015,495 B2 | 9/2011 | Achacoso et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 8,457,545 B2 | 6/2013 | Chan |
| 8,484,111 B2 | 7/2013 | Frankland et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0049749 A1 * | 4/2002 | Helgeson et al. ................. 707/3 |
| 2002/0072951 A1 | 6/2002 | Lee et al. |
| 2002/0082892 A1 | 6/2002 | Raffel et al. |
| 2002/0095408 A1 * | 7/2002 | Cheng ............................... 707/3 |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2003/0229610 A1 * | 12/2003 | Van Treeck ...................... 707/1 |
| 2003/0233404 A1 | 12/2003 | Hopkins |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0065925 A1 | 3/2005 | Weissman et al. |
| 2005/0091098 A1 | 4/2005 | Brodersen et al. |
| 2005/0223022 A1 | 10/2005 | Weissman et al. |
| 2005/0283478 A1 | 12/2005 | Choi et al. |
| 2006/0021019 A1 | 1/2006 | Hinton et al. |
| 2006/0143193 A1 * | 6/2006 | Thakkar et al. ............... 707/100 |
| 2006/0206834 A1 | 9/2006 | Fisher et al. |
| 2008/0249972 A1 | 10/2008 | Dillon |
| 2008/0263142 A1 * | 10/2008 | Glass et al. .................. 709/203 |
| 2009/0063415 A1 | 3/2009 | Chatfield et al. |
| 2009/0100342 A1 | 4/2009 | Jakobson |
| 2009/0112801 A1 * | 4/2009 | Bloesch et al. .................. 707/3 |
| 2009/0177744 A1 | 7/2009 | Marlow et al. |
| 2009/0193039 A1 * | 7/2009 | Bradley et al. ............... 707/100 |
| 2009/0313309 A1 * | 12/2009 | Becker et al. ................. 707/203 |
| 2010/0241637 A1 * | 9/2010 | Kissner et al. ................ 707/752 |
| 2013/0218948 A1 | 8/2013 | Jakobson |
| 2013/0218949 A1 | 8/2013 | Jakobson |
| 2013/0218966 A1 | 8/2013 | Jakobson |

* cited by examiner

SYSTEM, METHOD AND COMPUTER PROGRAM PRODUCT FOR AUTOMATIC CODE GENERATION FOR DATABASE OBJECT DELETION

CLAIM OF PRIORITY

This application claims the benefit of U.S. Provisional Patent Application 61/317,667 entitled "METADATA-DRIVEN DELETE," by Wong et al., filed Mar. 25, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to object deletion in a database system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, the manner in which object deletion is handled is tedious, particularly where objects have relationships with other objects. For example, a parent object may have a child object, thus necessitating deletion of the child object upon deletion of the parent object. As another example, a parent object may have a child object which is restricted from being deleted, such that deletion of the parent object may also be restricted by virtue of the deletion restriction on the child object.

Conventional database systems have generally handled deletion with respect to related objects using hand-written code. In particular, deletion of each object has been handled using code hand-written for that object, with hand-written duplicated code or recursive calls to cascade to the child objects. Thus, these conventional database approaches to deleting objects is prone to user mistakes. Accordingly, it is desirable to provide techniques enabling the automation of code generation for deleting database objects to improve the accuracy related to deleting database objects.

BRIEF SUMMARY

In accordance with embodiments, there are provided mechanisms and methods for automatic code generation for database object deletion. These mechanisms and methods for automatic code generation for database object deletion can enable embodiments to generate code for deleting database objects in an automated manner. The ability of embodiments to generate code for deleting database objects in an automated manner can enable the efficient and accurate deletion of database objects, including database objects with relationships to other database objects.

In an embodiment and by way of example, a method for automatic code generation for database object deletion is provided. In use, metadata for a database table is identified. Additionally, for objects of the database table, an associated delete method is determined, using the metadata. Further, for each foreign key relationship between the objects of the database table, an associated delete constraint is determined, using the metadata. Still yet, code for deleting the objects is automatically generated, using the determined delete method and the delete constraint.

While one or more implementations and techniques are described with reference to an embodiment in which automatic code generation for database object deletion is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for automatic code generation for database object deletion.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for providing automatic code generation for database object deletion will be described with reference to example embodiments.

Figure 1:
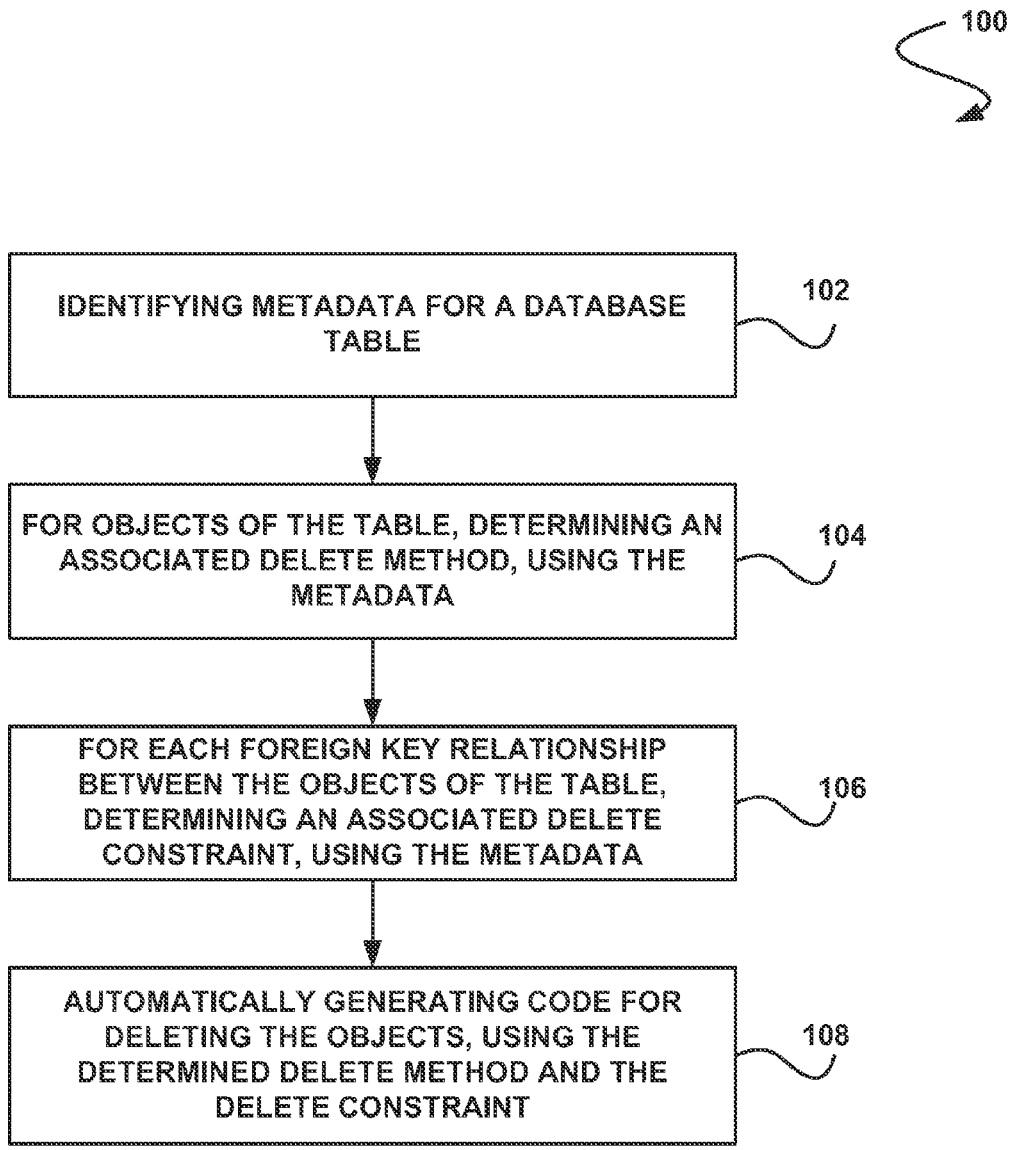
FIG. 1 illustrates a method for automatic code generation for database object deletion, in accordance with an embodiment.

FIG. 1 illustrates a method 100 for automatic code generation for database object deletion, in accordance with an embodiment. As shown in operation 102, metadata for a database table is identified. In the context of the present description, the database table may include any table of a database storing a plurality of objects. For example, the objects may include a record (e.g. row) in a database table.

As an option, the database may be of a multi-tenant on-demand database system. For example, the database may store data for one or more tenants of the multi-tenant on-demand database system. Accordingly, each object may include data associated with one of the tenants of the multi-tenant on-demand database system.

Further, the metadata for the database table may be specific to the database table. In one embodiment, the metadata may describe the objects of the database table, such as various characteristics of the objects, rules associated with the objects, relationships between the objects, etc. In another embodiment, the metadata may be referenced by the database table, or vice versa.

To this end, the metadata may be identified via its association with the database table. For example, the metadata may be identified in response to creation of the database table and/or storage of the database table (including the metadata) in a database. Of course, it should be noted that the metadata may be identified in any desired manner.

Additionally, for objects of the database table, an associated delete method is determined, using the metadata. Note operation 104. As an option, the metadata may include (i.e. store) the delete method. As another option, the metadata may reference the delete method. Thus, the delete method may be determined either directly or indirectly from the metadata.

In the context of the present description, the delete method may include any method (e.g. technique, function, rule, etc.) by which deletion of the objects is controlled. In this way, the delete method may be configured for the database table, for controlling the manner in which deletion of the objects of the table is handled. For example, the delete method may be automatically configured (e.g. based on a rules or manually configured for the database table by a user (e.g. during creation of the database table).

As an option, the delete method may include one of a plurality of predetermined methods associated with database object deletion. Accordingly, the delete method may be selected from the predetermined methods. In the embodiment described above where the delete method is manually configured by a user, such manual configuration may be made via a graphical user interface, for example by selecting one of the predetermined methods.

In one embodiment, the predetermined methods may include at least one first method for recording deletion. For example, deleting an object via the first method may involve recording the deletion (e.g. in a log), such as an indicator that the object (and any related objects) that has been deleted. Such recording may allow for subsequent undeletion.

One example of the first method for recording deletion may include a soft-delete. The soft-delete may involve incrementing a counter associated with an object being deleted upon deletion of the object, where the counter indicates the deletion. Thus, the object may not necessarily be deleted from the database in which it is stored, but the counter may be used such that a query identifying the object does not return the object (thus making it appear that the object has been deleted). Optionally, with respect to the soft-delete method, the object may only be hard-deleted when the counter reaches a predetermined number (e.g. two).

As another example, the first method for recording deletion may include a hard-delete. The hard-delete may involve automatically removing the object from the database in which it is stored as a result of a deletion of the objection. As yet another example, the first method for recording deletion may include a combination where the object is hard-deleted if it is directly deleted by the user, but soft-deleted if the user deletes another object which cascades to it, as described in more detail below.

In another embodiment, the predetermined methods may include at least one second method for not recording deletion. For example, deleting an object via the second method may not necessarily involve recording the deletion. One example of the second method may include a no delete. For example, the object may be restricted from being deleted in any manner (e.g. restricted from soft-delete and hard-delete. In this way, undeletion of the object may not be necessary since the object is restricted from being deleted (and thus no need for any sort of deletion recordation).

Another example of the second method may include a delete by query. The delete by query may involve performing a query to identify all objects related to the object being deleted, and automatically deleting the object and its related objects (e.g. via soft-delete, as described above). To undelete the object and related objects, a query may again be executed to identify all objects related to the deleted object, such that the object and related objects may be undeleted. By using the query, recordation of the deletion of the object and related objects may be unnecessary for use in undeleting the same.

Further, for each foreign key relationship between the objects of the database table, an associated delete constraint is determined, using the metadata. Note operation 106. As an option, the metadata may include (i.e. store) the delete constraint(s) associated with the foreign key relationships. As another option, the metadata may reference the delete constraint(s) associated with the foreign key relationships. Thus, the delete constraint(s) may be determined either directly or indirectly from the metadata.

In the context of the present description, the delete constraint may include any limitation or rule otherwise limiting object deletion (e.g. limiting the delete method). As noted above, the delete constraint is configured for each foreign key relationship between database objects. To this end, the delete constraint may also be configured for limiting the manner in which a database object may be deleted. In one embodiment, the delete constraint may be placed on a foreign key of the object (e.g. unique to the object).

For example, the delete constraint may be automatically configured for each foreign key relationship. As an option, the automatic configuration may be based on predefined rules, such that the delete constraint may be dynamically determined for a particular foreign key relationship. As another example, the delete constraint may be static for each foreign key relationship. Optionally, the delete constraint may be manually configured for a foreign key relationship by a user (e.g. during configuration of a foreign key relationship between objects).

As an option, the delete constraint may include one of a plurality of predetermined delete constraints (e.g. actions) associated with database object deletion. Accordingly, the delete constraint may be selected from the predetermined constraints. In the embodiment described above where the delete constraint is manually configured by a user, such manual configuration may be made via a graphical user interface, for example by selecting one of the predetermined delete constraints.

In one embodiment, the predetermined delete constraints may include a restriction for preventing deletion. For example, the restriction may prevent an object from being deleted when a child object of that object has its delete method configured as restrict or restriction on delete. Thus, where a child object exists, the parent object cannot be deleted.

In another embodiment, the predetermined delete constraints may include a cascade delete for deleting related objects. The cascade delete may involve deleting an object when its related object is being deleted. For example, if a parent object is deleted, the child object is deleted.

In yet another embodiment, the predetermined delete constraints may include a set null for setting the foreign key to null. In the present embodiment, the pointer may include a pointer to an object being deleted. For example, when a parent object is being deleted, for any child object that points to the parent object via the foreign key, the foreign key is set to null on the child object.

Further, as shown in operation 106, code for deleting the objects is automatically generated, using the determined delete method and the delete constraint. The code may be generated using any desired language capable of being executed for deleting the at least one database object. For example, the code may be generated using Procedural Language/Structured Query Language (PLSQL).

In one embodiment, the code may be generated based on a computation associated with the delete constraint. For example, the computation may include determining whether the delete constraint allows deletion of the objects having the associated foreign key relationship.

For example, if it is determined that the delete constraint is a restriction on deletion of one of the objects, then the computation may indicate that the delete constraint does not allow deletion of the object. As another example, if it is determined that the delete constraint is a cascade delete, then the computation may indicate that all child objects related to the deleted object are to be deleted (e.g. all child objects of the database object). However, the computation may also involve performing the method 100 for each of such related database objects, such that the computation may indicate that the database object may not necessarily be allowed to be deleted if any of the related objects are not allowed to be deleted.

As yet another example, if it is determined that the constraint is a set null, then the computation of the database object may indicate that any child objects related to the database object are updated to have their pointer to the deleted object set to null. Note that when cascade delete is applied to delete child objects, the child object may have its own child object, and the constraints on the child-to-grandchild relationships may be applied as well. For example, if the child-to-grandchild relationship is cascade, then the grandchild objects are also to be deleted. But if the child-to-grandchild relationship is restrict, this would prevent the child objects from being deleted, which further prevents the original object from being deleted. Generally, the generated code may handle this by using recursive method calls.

In one embodiment, if it is determined that the delete constraint allows deletion of the objects having the associated foreign key relationship, then the code may be automatically generated to delete the objects having the associated foreign key relationship using the delete method. For example, if it is determined that the at least one constraint allows deletion of the database object (and optionally that at least one other database object related to the database object is to be deleted with deletion of the database object, e.g. via cascade delete), then the code may be automatically generated to delete the database object [and optionally the related database object(s)] using the delete method determined in operation 104. In this way, in response to receipt of a request to delete an object, the code may be executed for deleting the object (and optionally any related objects, based on the constraints associated with the foreign key relationships between the object and the related objects).

Figure 2:
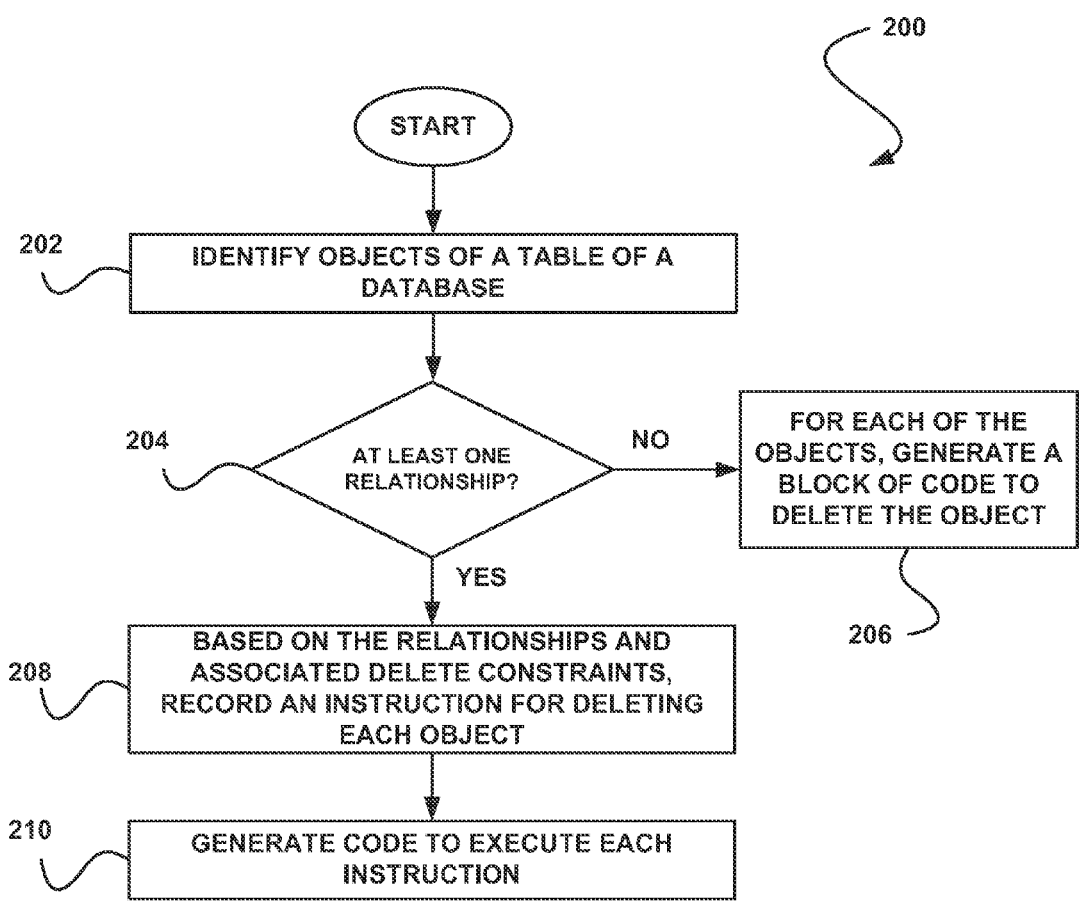
FIG. 2 illustrates a method for automatically generating code for use in database object deletion, using object specific metadata, in accordance with an embodiment.

FIG. 2 illustrates a method 200 for automatically generating code for use in database object deletion, using object specific metadata, in accordance with an embodiment. As an option, the present method 200 may be carried out in the context of the functionality of FIG. 1. Of course, however, the method 200 may be carried out in any desired environment. The aforementioned definitions may apply during the present description.

As shown in operation 202, objects of a table of a database are identified. Such objects may include any objects stored in the table of the database. Moreover, in the present embodiment, the table has metadata associated therewith, for use as described below.

In addition, as shown in decision 204, it is determined whether at least one relationship exists between any of the objects. The relationship may include a parent-child relationship between two or more of the objects, for example. As an option, the determination may be made by analyzing the metadata and/or the objects themselves.

If it is determined that no relationships exist, a block of code is generated for each object, for use in deleting the associated object. Note operation 206. In the present embodiment the block of code may include an instruction for deleting each of the objects (e.g. according to a delete method indicated by the metadata).

In response to a determination that at least one relationship exists, an instruction for deleting each object is recorded, based on the relationship(s) and any associated delete constraints. Note operation 206. For example, each relationship between two or more of the objects may be identified. Then, for each relationship, it may be determined whether objects associated with the relationship are allowed to be deleted, based on a delete constraint associated with such relationship. In the present embodiment, the delete constraint may be indicated by the metadata.

Accordingly, operation 206 may be utilized to determine an action to take (i.e. instruction to execute), for each of the objects when a request to delete such objects is received, for example where the actions may include deleting or restricting an associated object. For example, the output of operation 206 may include a plurality of object identifiers and associated instructions stored in a temporary data structure. In one embodiment, operation 206 may involve a recursive operation, such that relationships are analyzed using the associated constraints in a hierarchical manner (e.g. when multiple levels of relationships exist).

Code is then generated to execute each of the instructions, as shown in operation 210. The code may be generated to execute the instructions according to the delete method indicated by the metadata, for example. Thus, for objects to be deleted, as indicated by the instructions, the objects may be deleting using the delete method. To this end, the generation of the code may be performed in a two step process, as noted above, namely first determining the action to take for each object when a delete request is received (operation 208) and second generating code to execute those actions according to the delete method indicated by the metadata.

In one embodiment, all metadata may be completely static, so the code generator (described above for performing the method 200 of FIG. 2) may be run exactly once to generate the exact code that is run for every user request. In another embodiment, metadata may be dynamically modifiable by the user, such as custom objects and custom foreign key relationships, and in that case, the code generator may dynamically read the metadata and then follow the above same operations. In yet another embodiment, some database objects may be static and some may be custom, so the code generator may generate a combination of static code followed by dynamic code. For example, where at least one of the objects includes a custom object and at least one of the objects includes a standard object, the automatically generated code for deleting the custom object may include dynamic code and the automatically generated code for deleting the standard object may include static code.

Table 1 illustrates an example of code which may be automatically created for deleting objects in accordance with the metadata associated with such objects. Specifically, the commented code may be that which is automatically created. In the example shown, the objects for which the delete code is being generated include an account parent object with at least one contact child object. Of course, it should be noted that the code is set forth for illustrative purposes only, and thus should not be construed as limiting in any manner.

TABLE 1

PROCEDURE prep_cascade(
    iIds IN . . .
) IS BEGIN
    CASE iKeyPrefix
//next line = automatically generated code
    WHEN KeyPrefixA.ACCOUNT THEN prep_cascade_account
(iIds, . . . );
    WHEN . . .
    END CASE;
END prep_cascade;
PROCEDURE prep_cascade_account(
    iIds IN . . .
    ioRestricts IN OUT NOCOPY . . .
    ioCascdes IN OUT NOCOPY . . .
) IS BEGIN
    //next 4 lines = automatically generated code - Cannot delete
account that has any case
    SELECT . . . BULK COLLECT INTO lNewRestricts
    FROM iIds joined to support.cases
    WHERE . . .
    Append lNewRestricts to ioRestricts, which is the returned list of
all restricts;
    //next 5 lines = automatically generated code - Cascade account to
contact
    SELECT . . . BULK COLLECT INTO lNewCascades
    FROM iIds joined to sales.contact
    WHERE . . .

TABLE 1-continued

Append lNewCascades to ioCascades, which is the returned list of all
cascades;
    prep_cascade(KeyPrefixC.Contact, lNewCascades, . . . );
    //next line = automatically generated code - Custom child restricts
and cascades
    For each custom child relationship, dynamically select the child
records and apply the constraint on the relationship;
END prep_cascade_account;

In Table 1, a single method bulk_delete_prepare( ) may be called to compute all cascades, restricts, and setnulls. It may enforce double-delete for objects that are already soft-deleted, record delete events in the database, and return relevant information back to Jave™. To compute cascades and restricts, prep_cascade( ) may be used to branch according to object type. This branching code may be generated. For each standard object type, the method prep_cascade_XXX( ) may be generated for every relationship that restricts or cascades. As shown, prep_cascade_account( ) recursively calls prep_cascade( ) so that the restrict or cascade logic is not duplicated from parent object to child object.

In the present embodiment, the generated code starts by reading the user input, which is a set of objects to delete. It calls bulk_delete_prepare( ) which computes all cascades, restricts, and setnulls. Afterwards, if there are restricts, it stops because the objects cannot be deleted. Otherwise, it calls another generated method (not shown) that simply performs the delete method on the computed set of objects to delete or cascade delete or setnull.

Figure 3:
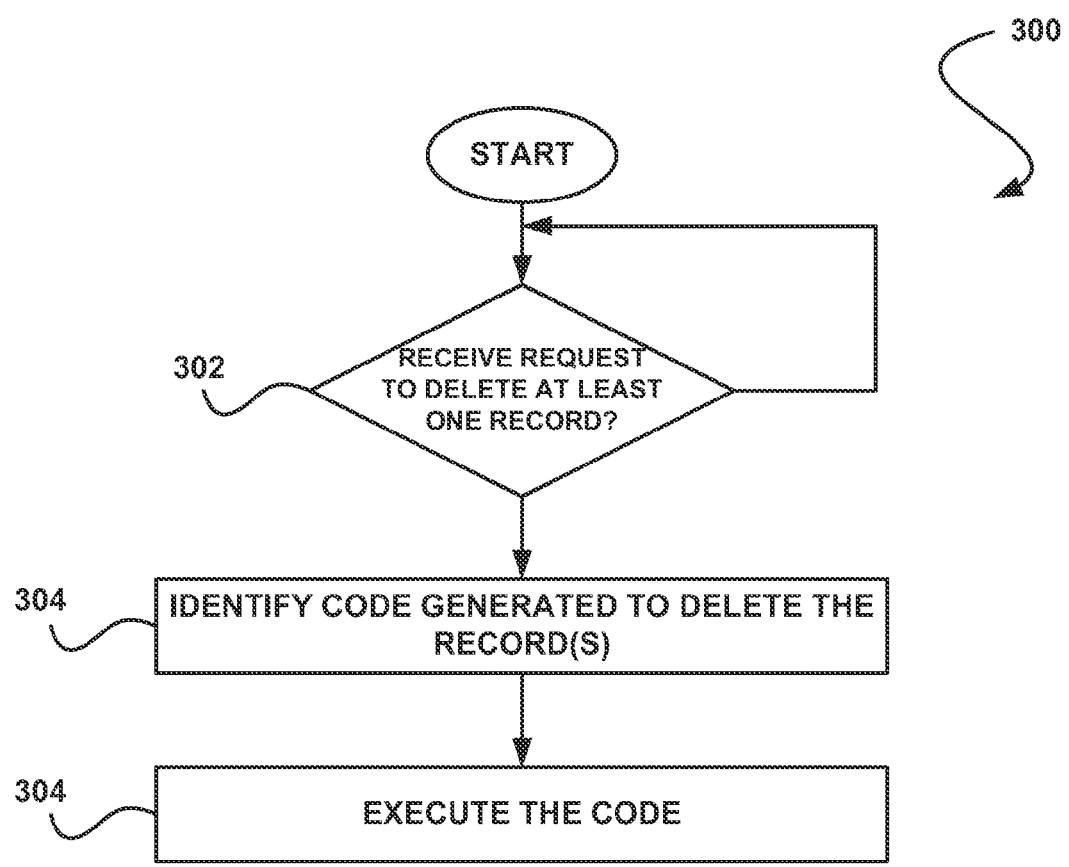
FIG. 3 illustrates a method for deleting database objects using generated code automatically generated using object specific metadata, in accordance with an embodiment.

FIG. 3 illustrates a method 300 for deleting database objects using generated code automatically generated using object specific metadata, in accordance with an embodiment. As an option, the present method 300 may be carried out in the context of the functionality of FIGS. 1-2. Of course, however, the method 300 may be carried out in any desired environment. The aforementioned definitions may apply during the present description.

As shown in decision 302, it is determined whether a request to delete at least one record is received. The request may be received from a user, for example. In one embodiment, the request may be to delete the record from a database.

If it is determined that a request to delete a record is not received, the method 300 continues to wait for receipt of such a request. However, in response to receipt of a request to delete a record, code generated to delete the record(s) is identified. Note operation 304. For example, the code may include at least a portion of the automatically generated code from the method 200 of FIG. 2.

The code is then executed to delete the record(s), as shown in operation 304. To this end, records may be deleted using code that is automatically generated. In particular, the records may be deleted using code that is automatically generated from metadata associated with such records.

Figure 4:
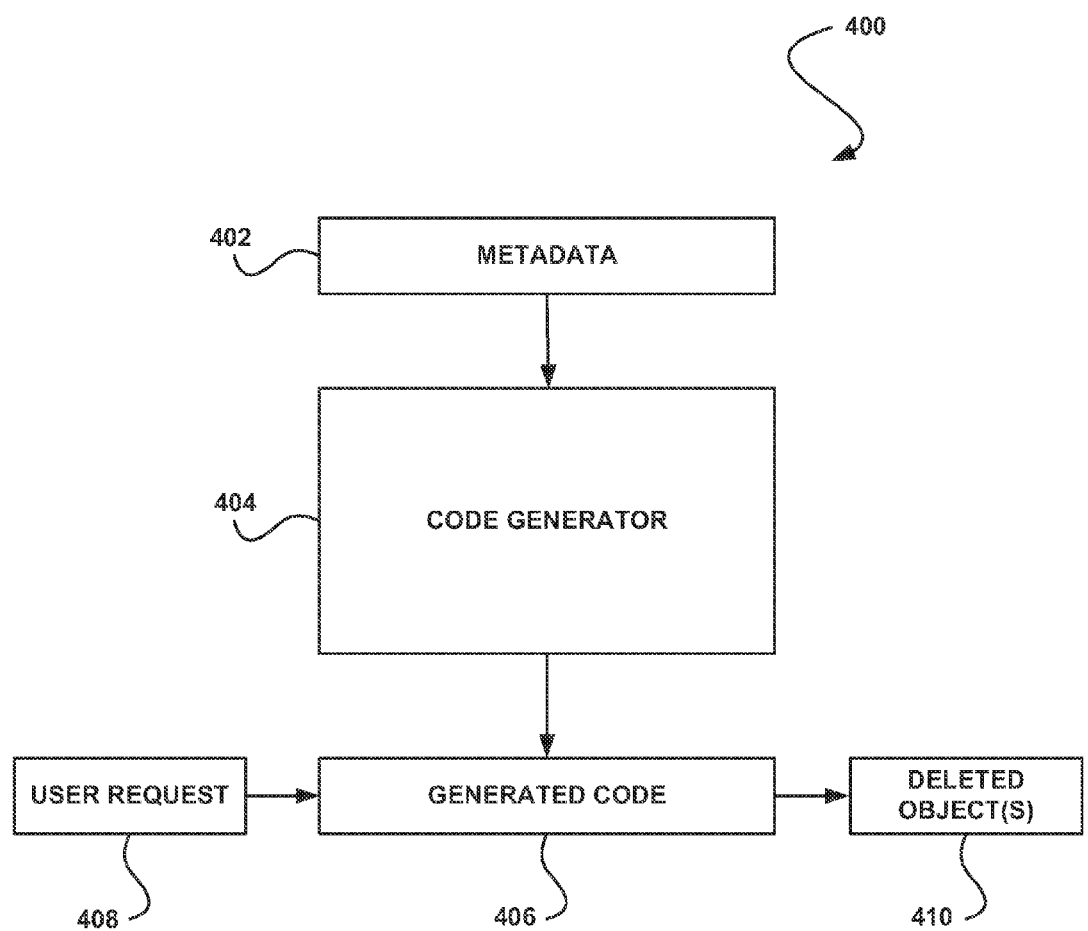
FIG. 4 illustrates a system for automatic code generation for database object deletion, in accordance with an embodiment.

FIG. 4 illustrates a system 400 for automatic code generation for database object deletion, in accordance with an embodiment. As an option, the present system 400 may be implemented in the context of the functionality of FIGS. 1-3. For example, the system 400 may be implemented by a multi-tenant on-demand database system. Of course, however, the system 400 may be implemented in any desired environment. The aforementioned definitions may apply during the present description.

As shown, the system 400 includes metadata 402. In the present embodiment, the metadata 402 is associated with each of a plurality of database objects stored by the system.

For example, the metadata 402 may be stored in association with the respective database objects.

A code generator 404 receives the metadata 402 as input for generating code 406. For example, the code generator 404 may receive a delete method and constraint from the metadata 402. The code generator 404 may then compute the constraint to identify whether the object and any related objects are capable of being deleted, to generate code 406 to delete the object (and related objects) according to their respective delete methods. To this end, the generated code 406 may operate to delete the object according to its associated delete method and constraint.

As shown, the generated code 406 takes as input objects identified from a user request 408 to delete such objects (e.g. a request to bulk delete objects). For example, the user request 408 may include identifiers of such objects. The generated code 406 may then perform deletion of the objects, such that a result of an execution of the generated code 406 is deleted objects 410.

System Overview

Figure 5:
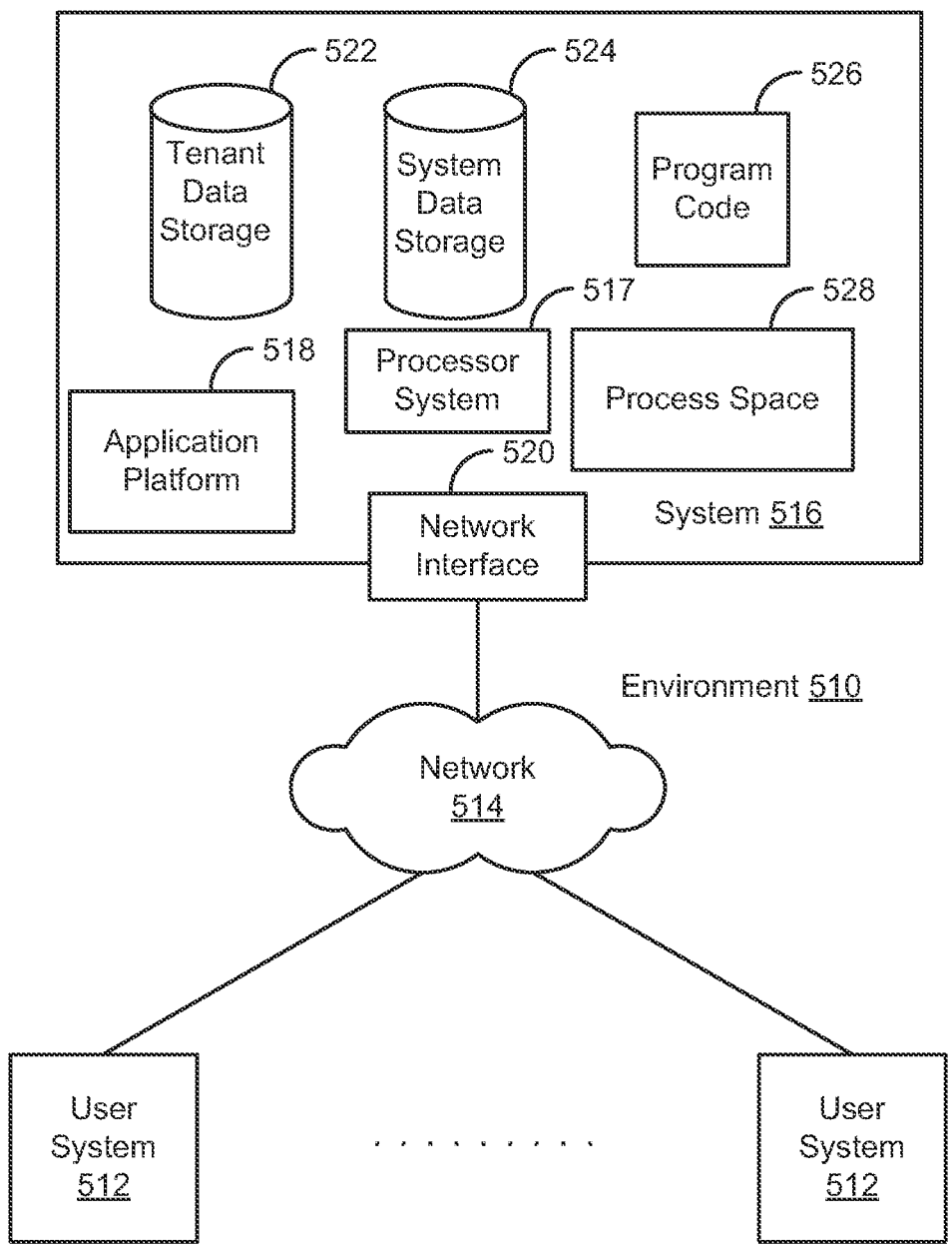
FIG. 5 illustrates a block diagram of an example of an environment wherein an on-demand database service might be used.

FIG. 5 illustrates a block diagram of an environment 510 wherein an on-demand database service might be used. Environment 510 may include user systems 512, network 514, system 516, processor system 517, application platform 518, network interface 520, tenant data storage 522, system data storage 524, program code 526, and process space 528. In other embodiments, environment 510 may not have all of the components listed and/or may have other elements instead of, or in addition to, those listed above.

Environment 510 is an environment in which an on-demand database service exists. User system 512 may be any machine or system that is used by a user to access a database user system. For example, any of user systems 512 can be a handheld computing device, a mobile phone, a laptop computer, a work station, and/or a network of computing devices. As illustrated in FIG. 5 (and in more detail in FIG. 6) user systems 512 might interact via a network 514 with an on-demand database service, which is system 516.

An on-demand database service, such as system 516, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 516" and "system 516" will be used interchangeably herein. A database image may include one or more database objects. A relational database management system (RDMS) or the equivalent may execute storage and retrieval of information against the database object(s). Application platform 518 may be a framework that allows the applications of system 516 to run, such as the hardware and/or software, e.g., the operating system. In an embodiment, on-demand database service 516 may include an application platform 518 that enables creation, managing and executing one or more applications developed by the provider of the on-demand database service, users accessing the on-demand database service via user systems 512, or third party application developers accessing the on-demand database service via user systems 512.

The users of user systems 512 may differ in their respective capacities, and the capacity of a particular user system 512 might be entirely determined by permissions (permission levels) for the current user. For example, where a salesperson is using a particular user system 512 to interact with system 516, that user system has the capacities allotted to that salesperson. However, while an administrator is using that user system to interact with system 516, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 514 is any network or combination of networks of devices that communicate with one another. For example, network 514 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 512 might communicate with system 516 using TCP/IP and, at a higher network level, use other common Internet protocols to communicate, such as HTTP, FTP, AFS, WAP, etc. In an example where HTTP is used, user system 512 might include an HTTP client commonly referred to as a "browser" for sending and receiving HTTP messages to and from an HTTP server at system 516. Such an HTTP server might be implemented as the sole network interface between system 516 and network 514, but other techniques might be used as well or instead. In some implementations, the interface between system 516 and network 514 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 516, shown in FIG. 5, implements a web-based customer relationship management (CRM) system. For example, in one embodiment, system 516 includes application servers configured to implement and execute CRM software applications as well as provide related data, code, forms, webpages and other information to and from user systems 512 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 516 implements applications other than, or in addition to, a CRM application. For example, system 516 may provide tenant access to multiple hosted (standard and custom) applications, including a CRM application. User (or third party developer) applications, which may or may not include CRM, may be supported by the application platform 518, which manages creation, storage of the applications into one or more database objects and executing of the applications in a virtual machine in the process space of the system 516.

One arrangement for elements of system 516 is shown in FIG. 5, including a network interface 520, application platform 518, tenant data storage 522 for tenant data 523, system data storage 524 for system data 525 accessible to system 516 and possibly multiple tenants, program code 526 for implementing various functions of system 516, and a process space 528 for executing MTS system processes and tenant-specific processes, such as running applications as part of an application hosting service. Additional processes that may execute on system 516 include database indexing processes.

Several elements in the system shown in FIG. 5 include conventional, well-known elements that are explained only briefly here. For example, each user system 512 could include a desktop personal computer, workstation, laptop, PDA, cell phone, or any wireless access protocol (WAP) enabled device or any other computing device capable of interfacing directly or indirectly to the Internet or other network connection. User system 512 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 512 to access, process and view information, pages and applications available to it from system 516 over network 514. Each user system 512 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 516 or other systems or servers. For example, the user interface device can be used to access data and applications hosted by system 516, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 512 and all of its components are operator configurable using applications, such as a browser, including computer code run using a central processing unit such as an Intel Pentium® processor or the like. Similarly, system 516 (and additional instances of an MTS, where inure than one is present) and all of their components might be operator configurable using application(s) including computer code to run using a central processing unit such as processor system 517, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 516 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 516 is configured to provide webpages, forms, applications, data and media content to user (client) systems 512 to support the access by user systems 512 as tenants of system 516. As such, system 516 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 6:
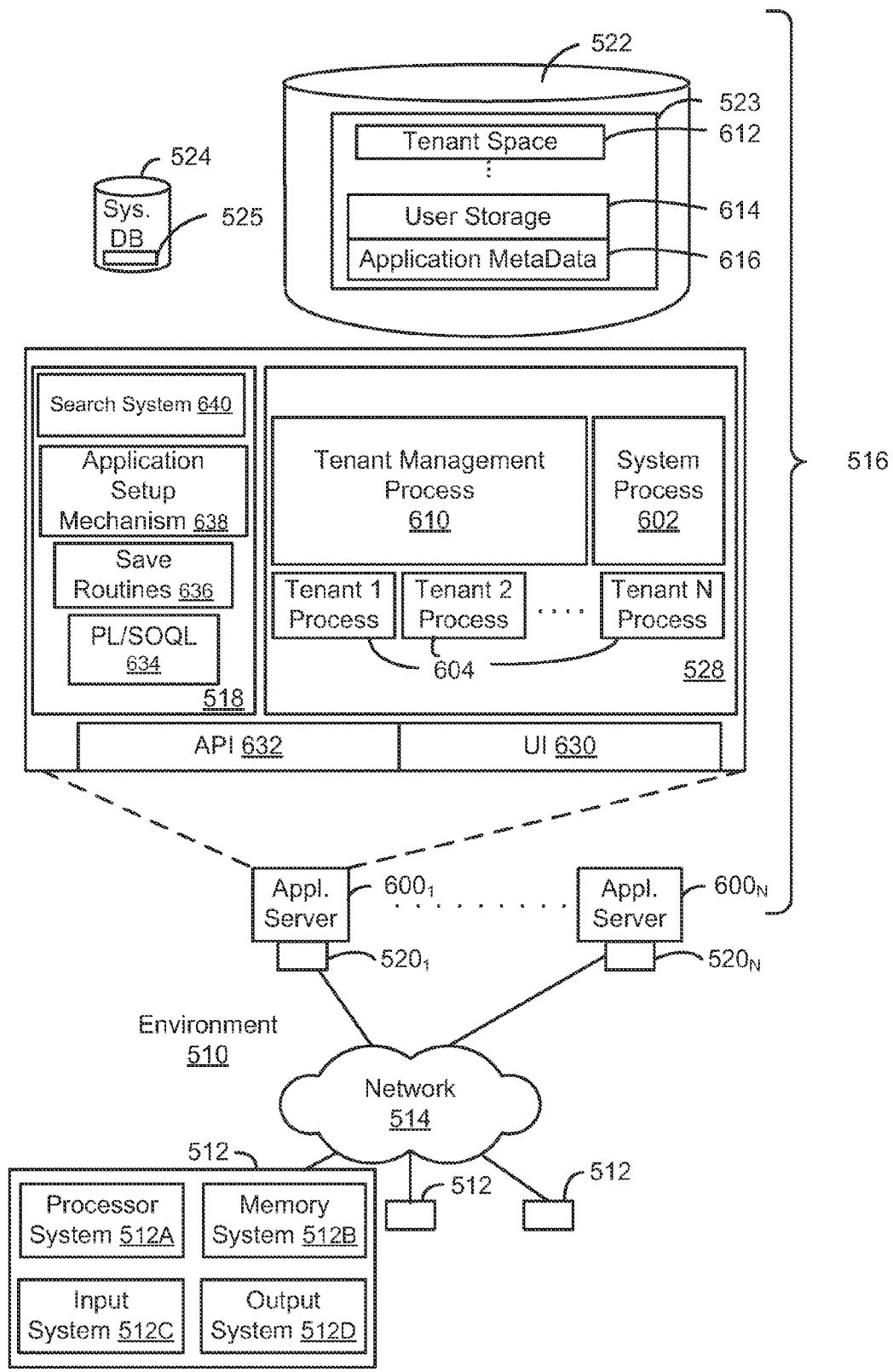
FIG. 6 illustrates a block diagram of an embodiment of elements of FIG. 5 and various possible interconnections between these elements.

FIG. 6 also illustrates environment 510. However, in FIG. 6 elements of system 516 and various interconnections in an embodiment are further illustrated. FIG. 6 shows that user system 512 may include processor system 512A, memory system 512B, input system 512C, and output system 512D. FIG. 6 shows network 514 and system 516. FIG. 6 also shows that system 516 may include tenant data storage 522, tenant data 523, system data storage 524, system data 525, User Interface (UI) 630, Application Program Interface (API) 632, PL/SOQL 634, save routines 636, application setup mechanism 638, applications servers $600_1$-$600_N$, system process space 602, tenant process spaces 604, tenant management process space 610, tenant storage area 612, user storage 614, and application metadata 616. In other embodiments, environment 510 may not have the same elements as those listed above and/or may have other elements instead of, or in addition to, those listed above.

User system 512, network 514, system 516, tenant data storage 522, and system data storage 524 were discussed above in FIG. 5. Regarding user system 512, processor system 512A may be any combination of one or more processors. Memory system 512B may be any combination of one or more memory devices, short term, and/or long term memory. Input system 512C may be any combination of input devices, such as one or more keyboards, mice, trackballs, scanners, cameras, and/or interfaces to networks. Output system 512D may be any combination of output devices, such as one or more monitors, printers, and/or interfaces to networks. As shown by FIG. 6, system 516 may include a network interface 520 (of FIG. 5) implemented as a set of HTTP application servers 600, an application platform 518, tenant data storage 522, and system data storage 524. Also shown is system process space 602, including individual tenant process spaces 604 and a tenant management process space 610. Each application server 600 may be configured to tenant data storage 522 and the tenant data 523 therein, and system data storage 524 and the system data 525 therein to serve requests of user systems 512. The tenant data 523 might be divided into individual tenant storage areas 612, which can be either a physical arrangement and/or a logical arrangement of data. Within each tenant storage area 612, user storage 614 and application metadata 616 might be similarly allocated for each user. For example, a copy of a user's most recently used (MRU) items might be stored to user storage 614. Similarly, a copy of MRU items for an entire organization that is a tenant might be stored to tenant storage area 612. A UI 630 provides a user interface and an API 632 provides an application programmer interface to system 516 resident processes to users and/or developers at user systems 512. The tenant data and the system data may be stored in various databases, such as one or more Oracle™ databases.

Application platform 518 includes an application setup mechanism 638 that supports application developers' creation and management of applications, which may be saved as metadata into tenant data storage 522 by save routines 636 for execution by subscribers as one or more tenant process spaces 604 managed by tenant management process 610 for example. Invocations to such applications may be coded using PL/SOQL 634 that provides a programming language style interface extension to API 632. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 616 for the subscriber making the invocation and executing the metadata as an application in a virtual machine.

Each application server 600 may be communicably coupled to database systems, e.g., having access to system data 525 and tenant data 523, via a different network connection. For example, one application server 600₁ might be coupled via the network 514 (e.g., the Internet), another application server 600ₙ₋₁ might be coupled via a direct network link, and another application server 600ₙ might be coupled by yet a different network connection. Transfer Control Protocol and Internet Protocol (TCP/IP) are typical protocols for communicating between application servers 600 and the database system. However, it will be apparent to one skilled in the art that other transport protocols may be used to optimize the system depending on the network interconnect used.

In certain embodiments, each application server 600 is configured to handle requests for any user associated with any organization that is a tenant. Because it is desirable to be able to add and remove application servers from the server pool at any time for any reason, there is preferably no server affinity for a user and/or organization to a specific application server 600. In one embodiment, therefore, an interface system implementing a load balancing function (e.g., an F5 Big-IP load balancer) is communicably coupled between the application servers 600 and the user systems 512 to distribute requests to the application servers 600. In one embodiment, the load balancer uses a least connections algorithm to route user requests to the application servers 600. Other examples of load balancing algorithms, such as round robin and observed response time, also can be used. For example, in certain embodiments, three consecutive requests from the same user could hit three different application servers 600, and three requests from different users could hit the same application server 600. In this manner, system 516 is multitenant, wherein system 516 handles storage of, and access to, different objects, data and applications across disparate users and organizations.

As an example of storage, one tenant might be a company that employs a sales force where each salesperson uses system 516 to manage their sales process. Thus, a user might maintain contact data, leads data, customer follow-up data, performance data, goals and progress data, etc., all applicable to that user's personal sales process (e.g., in tenant data storage 522). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 516 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 516 might also maintain system level data usable by multiple tenants or other data. Such system level data might include industry reports, news, postings, and the like that are sharable among tenants.

In certain embodiments, user systems 512 (which may be client systems) communicate with application servers 600 to request and update system-level and tenant-level data from system 516 that may require sending one or more queries to tenant data storage 522 and/or system data storage 524. System 516 (e.g., an application server 600 in system 516) automatically generates one or more SQL statements (e.g., one or more SQL queries) that are designed to access the desired information. System data storage 524 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A computer program product, comprising a non-transitory computer usable medium having a computer readable program code embodied therein, the computer readable program code causing a computer to implement a method for automatic code generation for object deletion, the method comprising:
    identifying by a database system an object within a database of the database system, where the object has a foreign key relationship with at least one other object within the database;
    receiving at the database system metadata specific to the database, the metadata including:
        a delete method by which the object is deleted within the database, and
        a delete constraint uniquely configured for the foreign key relationship of the object, the delete constraint limiting deletion of the object within the database; and
    automatically generating code by the database system for deleting the object in response to a user request to delete the object within the database, using the received delete method and the delete constraint included in the metadata, by:
        inputting by the database system the metadata including the delete method and the delete constraint into a code generator in response to the user request to delete the object within the database,
        determining whether the delete constraint allows deletion of the object of the database, and
        upon determining that the delete constraint allows deletion of the object of the database having the foreign key relationship, automatically generating code to delete the object using the delete method in response to the input, utilizing the code generator.

2. The computer program product of claim 1, wherein the object includes a record stored in the database.

3. The computer program product of claim 2, wherein the database system includes a multi-tenant on-demand database system.

4. The computer program product of claim 1, wherein the metadata describes the object.

5. The computer program product of claim 1, wherein the metadata is referenced by the database.

6. The computer program product of claim 1, wherein the delete method includes one of a plurality of predetermined methods associated with database object deletion.

7. The computer program product of claim 6, wherein the predetermined methods include at least one first method for recording deletion and at least one second method for not recording deletion.

8. The computer program product of claim 7, wherein the at least one first method for recording deletion is associated with a soft-delete and a hard-delete.

9. The computer program product of claim 7, wherein the at least one second method for not recording deletion is associated with no delete and delete by query.

10. The computer program product of claim 1, wherein the delete constraint includes at least one of a plurality of predetermined actions associated with database object deletion.

11. The computer program product of claim 10, wherein the plurality of predetermined actions include at least one of a restriction for preventing deletion, a cascade delete for deleting related objects, and a set null for setting a pointer to null.

12. The computer program product of claim 1, wherein the object includes a custom object or a standard object, where the automatically generated code for deleting the custom object includes dynamic code and the automatically generated code for deleting the standard object includes static code.

13. A method, comprising:
    identifying by a database system an object within a database of the database system, where the object has a foreign key relationship with at least one other object within the database;
    receiving at the database system metadata specific to the database, the metadata including:
        a delete method by which the object is deleted within the database, and
        a delete constraint uniquely configured for the foreign key relationship of the object, the delete constraint limiting deletion of the object within the database; and
    automatically generating code by the database system for deleting the object in response to a user request to delete the object within the database, using the received delete method and the delete constraint included in the metadata, by:
        inputting by the database system the metadata including the delete method and the delete constraint into a code generator in response to the user request to delete the object within the database,
        determining whether the delete constraint allows deletion of the object of the database, and upon determining that the delete constraint allows deletion of the object of the database having the foreign key relationship, automatically generating code to delete the object using the delete method in response to the input, utilizing the code generator.

14. An apparatus, comprising:
a processor for:
identifying by a database system an object within a database of the database system, where the object has a foreign key relationship with at least one other object within the database;
receiving at the database system metadata specific to the database, the metadata including:
  a delete method by which the object is deleted within the database, and
  a delete constraint uniquely configured for the foreign key relationship of the object, the delete constraint limiting deletion of the object within the database; and
automatically generating code by the database system for deleting the object in response to a user request to delete the object within the database, using the received delete method and the delete constraint included in the metadata, by:
  inputting by the database system the metadata including the delete method and the delete constraint into a code generator in response to the user request to delete the object within the database,
  determining whether the delete constraint allows deletion of the object of the database, and
  upon determining that the delete constraint allows deletion of the object of the database having the foreign key relationship, automatically generating code to delete the object using the delete method in response to the input, utilizing the code generator.

15. The computer program product of claim 1, wherein the code generator is run only once to generate the code to delete the object having the foreign key relationship using the delete method, when it is determined that the delete constraint allows deletion of the object having the foreign key relationship, and wherein the generated code is run for every user request to delete the object.

16. The computer program product of claim 1, wherein the code includes an instruction for deleting the object according to the delete method configured for the database.

17. The computer program product of claim 1, wherein the delete constraint includes a limitation to the delete method and is unique to the objects of the database having the foreign key relationship.

18. The computer program product of claim 1, wherein the delete constraint includes a restriction preventing the object of the database having the foreign key relationship from being deleted when a child object of that object has a predetermined delete method configuration.

* * * * *